United States Patent
Wyman

[11] Patent Number: 5,902,658
[45] Date of Patent: May 11, 1999

[54] DIMENSIONALLY STABLE, WATER IMPERVIOUS RUG UNDERLAY WITH DOUBLE SIDED PRESSURE SENSITIVE ADHESIVE AND PROTECTIVE PEELABLE LINERS

[76] Inventor: Oliver A. Wyman, 601 Mt. Sinai Rd., Dalton, Ga. 30720

[21] Appl. No.: 08/912,926

[22] Filed: Aug. 15, 1997

[51] Int. Cl.⁶ ........................................... B32B 33/00
[52] U.S. Cl. .................. 428/40.1; 428/41.8; 428/95; 442/22
[58] Field of Search .................. 428/40.1, 41.8, 428/95; 442/22

[56] References Cited

U.S. PATENT DOCUMENTS

| | | | |
|---|---|---|---|
| 3,110,905 | 11/1963 | Rhodes | 139/391 |
| 3,542,632 | 11/1970 | Eickhoff | 428/95 |
| 3,922,454 | 11/1975 | Roecker | 428/95 |
| 4,557,774 | 12/1985 | Hoopengardner | 428/95 |
| 4,647,484 | 3/1987 | Higgins | 428/95 |
| 4,797,170 | 1/1989 | Hoopengardner | 156/71 |
| 4,990,399 | 2/1991 | Hoopengardner | 428/95 |
| 5,082,705 | 1/1992 | Rose | 428/95 |
| 5,304,268 | 4/1994 | Hoopengardner | 156/90 |
| 5,601,910 | 2/1997 | Murphy | 442/79 |
| 5,612,113 | 3/1997 | Irwin, Sr. | 428/95 |

OTHER PUBLICATIONS

Brochure, Rug–Lock—For Rugs on Carpet, Date Unknown.

*Primary Examiner*—Nasser Ahmad
*Attorney, Agent, or Firm*—Kerkam, Stowell, Kondracki & Clarke, P.C.; Edward J. Kondracki

[57] ABSTRACT

A dimensionally stable rug underlay includes a water impervious woven web of flat monofilament yarn having its opposite surfaces and its interstices coated with a latex acrylic pressure sensitive non-aggressive adhesive forming a water impervious web and a protective releasable polymer film or liner on each of the opposite adhesive surfaces. The product is dimensionally stable and approximately 1 mm in thickness.

6 Claims, 1 Drawing Sheet

DIMENSIONALLY STABLE, WATER IMPERVIOUS RUG UNDERLAY WITH DOUBLE SIDED PRESSURE SENSITIVE ADHESIVE AND PROTECTIVE PEELABLE LINERS

FIELD OF THE INVENTION

The present invention relates to rug underlays and more particularly to an underlay for adhering a rug to a carpet and the resultant rug product.

DESCRIPTION OF RELATED ART

Rugs are frequently used to enhance the appearance of rooms by placing them at selected locations. In such situations, it is desirable to provide an underlay beneath the underside of the rug to prevent the rug from slipping. Such underlays may take many forms, depending generally on the surface on which the rug is placed. For smooth surfaces, such as wooden floors, a natural rubber or latex open web construction is desirable. Such construction provides a superior gripping power and enables dirt sifting down from the rug to be easily removed. The open web construction allows the rug to breath, enabling moisture to be quickly evaporated. The natural rubber open product can be fabricated in various thicknesses, thus, providing additional cushioning and shock absorbency, enhancing the luxurious feel of the rug underfoot.

When rugs are used on carpeted areas, different considerations come into play, particularly because of the possibility of staining the face yarns of the underlying carpet due to spills. This is particularly important with rugs dyed with vegetable dyes. Colorations made with vegetable dyes are prone to run when wet. Thus, open mesh underlays do not satisfy the condition of protecting against staining by preventing spills and moisture from reaching the underlying carpet. Further, because of the texture of the pile surface of carpet, an open mesh underlay does not necessarily provide adequate gripping power to keep the rug from shifting on the carpet. Further some of the resilience and cushioning effect is lost when the pile yarn extends through the open areas in the underlay.

For many years, a particular popular underlay for rugs placed on carpets has been available under the name RUG LOCK® sold by Rug Hold, Inc., of Dalton, Ga. This RUG LOCK® product comprised a 4 to 5 ounce felt underlay, opposite sides of which have a releasable polypropylene film. In fabrication, the felt is saturated with an adhesive usually applied by spraying to provide a substrate which is tacky on both sides. The polymer film is applied to both sides and to place the product on the carpet, the polymer films are removed. One side of the underlay is applied to the backside of the rug, while the other side is used to secure the rug to the carpet.

While this product has been the standard in the industry for many years, the product is subject to many disadvantages. For example, in application of the adhesive to the felt, the adhesive was sprayed on the felt. The felt tended to absorb too much adhesive which would work excessively into the porous surfaces of the untreated felt pad. The adhesive could then transfer onto the pile face of the carpet and between the fibers. When the rug was to be raised or removed, the rug was difficult to remove and the underlying carpet could be stained. Further, if the adhesive transferred to the carpet, a high powered solvent had to be used to clean the adhesive from the underlying carpet. This could destroy carpet coloration. A further disadvantage of this type of product is that the application of the adhesive was difficult to control because the felt disguises the amount of adhesive applied. Further, adhesive has a tendency to clog spray heads making application thereof difficult and unnecessarily costly due to product line interruption.

A serious disadvantage of the aforenoted product was that the product is not water repellant. This is frequently disastrous for rugs made of vegetable dyes because of staining of the underlying carpet when a spill occurs on the rug.

SUMMARY OF THE INVENTION

With the foregoing in mind, it is a primary object of the present invention to provide an improved rug underlay which may be readily applied to the undersurface of a rug which can then be firmly adhered to the textile surface of a carpet and which does not suffer from the aforenoted disadvantage.

Another object of the present invention is to provide an improved rug underlay which can be readily applied to the underside of a rug and which minimizes the possibility of staining the underlying surface, such as a carpet on which the rug is placed, due to liquid spills.

A further object of the present invention is to provide an improved rug underlay which is water impervious. A further object of the present invention is to provide an improved rug underlay having gripping characteristics. Still another object of the invention is to provide an improved rug underlay having improved dimensional stability and which can be efficiently manufactured.

These objects and their attendant advantages are achieved in accordance with the present invention, where there is provided a rug underlay comprising a woven polypropylene substrate or base to which a non-aggressive latex-acrylic adhesive coating is applied to both sides which render the base water impervious. A release foil is applied to the adhesive coatings. When installing the product, if done at site, the rug to which the product is to be applied is first placed face down. An underlay is chosen or trimmed to the size of the rug and after a layer of foil is removed, the adhesive side of the underlay is pressed against the back of the rug. The rug is then placed over the carpet at the exact location where it is to be installed. The rug is then folded back halfway upon itself, and half of the exposed release foil is peeled off to expose one-half of the adhesive face of the side which is to be applied to the rug. The rug is thereafter folded back on the carpet and the process is repeated with the other half of the underlay. The other half of the release foil is removed and after the remainder of the release foil is removed, the folded portion of the underlay is then folded back on the carpet to allow the full coating to adhesively grip the fibers of the carpet.

As should be apparent, the rug underlay can be applied at a manufacturing location so that rugs ready for installation on carpet can be readily handled and shipped.

In accordance with the invention, the underlying substrate is woven from a flat ribbon monofilament polypropylene yarn of at least 15 pick to which an acrylic latex pressure sensitive adhesive is applied to both sides to fill the interstices of the warp and weft or fill yarns of the woven product. This renders the base or substrate water impervious. The acrylic adhesive is applied to the woven substrate in a dip and squeeze operation, thus avoiding the problem of clogged spray heads. The base fabric is run through a trough of adhesive and then passed through two rollers which squeeze excessive adhesive from the base fabric into the trough. The product is then passed through the oven and dried.

Advantages of the product include:

—It is extremely thin, approximately 1 mm, and does not raise the height of the rug keeping it close to the very edges of the rug to ensure maximum hold and no lifting of the rug edges.

—It is dimensional stable and will not stretch or creep and is economical to manufacture.

—It is water impervious and, thus, will not allow spills to go through which could result in stains on the underlying carpet.

BRIEF DESCRIPTION OF THE DRAWINGS

The invention is illustrated in the accompanying drawings wherein like parts are identified with like characters throughout the center views and in which FIGS. 1 and 2 each show a schematic cross sectional view of the typical prior art carpet produced using a primary backing of the prior art.

DESCRIPTION OF THE PREFERRED EMBODIMENTS

Figure 1:
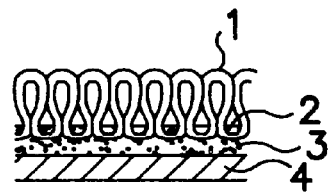
Figure 2:
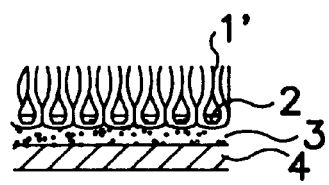

FIG. 1 shows a typical prior art carpet in fragmentary cross section including pile or face yarns 1 of the loop type which are tufted into a primary backing 2 with the tufts locked in place by a suitable latex 3 to which is adhered a secondary back 4. FIG. 2 is similar to FIG. 1 except that face yarns 1' are of the cut type.

A carpet of the type shown in FIGS. 1 and 2 may generally vary in size and frequently is laid wall to wall. In order to enhance the overall appearance of the room, designers frequently intersperse the surface of the carpet with rugs according the decor of the room.

Figure 3:
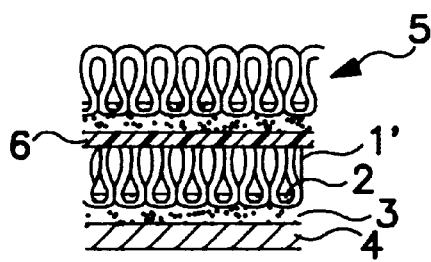
FIG. 3 shows a schematic cross sectional view of a rug applied to a carpet utilizing the underlay of the present invention.
Figure 4:
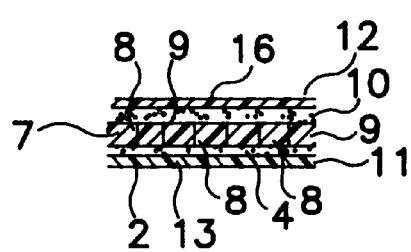
FIG. 4 shows a schematic cross sectional view of the underlay of the present invention.
Figure 5:
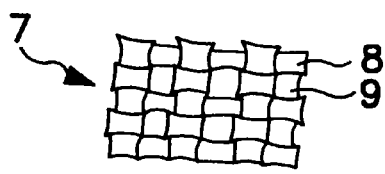
FIG. 5 shows fragmentary plan view of the base fabric or substrate employed in the present invention.

As seen in FIG. 3, a rug 5 is shown placed on the cut pile face of yarns 1'. The underside of rug 5 includes an underlay 6, as shown in FIG. 5. The base fabric of underlay 6 is a woven synthetic plastic primary backing, preferably made of flat, monofilament polypropylene warp yarns 8 and weft fill yarns 9.

The synthetic plastic used for the yarns of the base material include those comprised of any of the synthetic plastic materials capable of formation into weavable yarns. Such plastics include, for example, polyethylene, polypropylene, ethylene/propylene co-polymers, numerous other polymers and co-polymers of other alpha-olefins, polyesters, polyimides, rayon, polyvinyl chloride and many other synthetic plastic materials. The invention is most especially applicable to those primary backings comprised of polypropylene yarns. A flat woven synthetic plastic backing of this type is illustrated in U.S. Pat. No. 3,110,905 of Travis M. Rhodes.

The yarns 8 and 9 are closely spaced flat ribbon monofilaments of substantially rectangular cross section and are crowded together to form a substantially flat surface with relatively small interstices at the crossing of the tightly woven warp and weft yarns. Advantageously, the yarns 8 and 9 are ribbons of rectangular cross section as disclosed in the aforenoted Rhodes U.S. Pat. No. 3,110,905. By using ribbon yarns for both warp and weft in a tight weave of at least 15 pick, the size of the interstices are minimized and there is obtained a substrate of substantially uniformed thickness of approximately 1 mm, inclusive of the protective release films.

In accordance with the present invention, the base or substrate 7 has applied to each side thereof a pressure sensitive non-aggressive latex acrylic adhesive 10 and 11 to which is applied a polymer release film 12 and 13, respectively.

Figure 6:
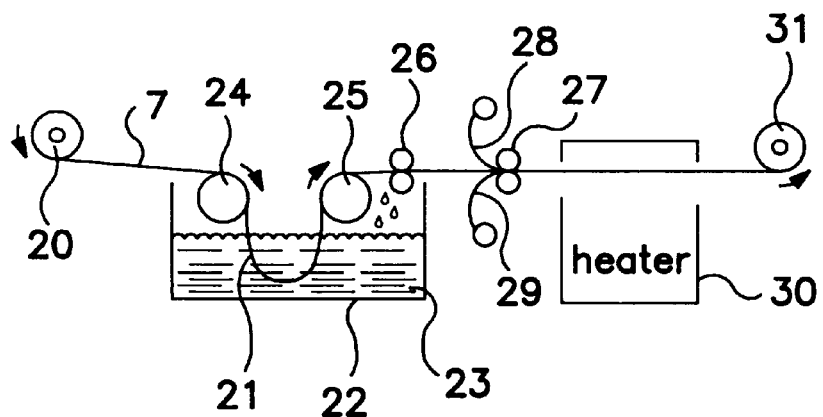
FIG. 6 illustrates the manner of applying the adhesive coating of the substrate of FIG. 5.

FIG. 6 shows the manner of fabricating the underlay of the present invention. To this end, a roll 20 of the woven ribbon base fabric 7 is unwound and passes over drums 24, 25 to form a loop of the fabric 21. The trough 22 contains a supply of adhesive 23 in which the loop extends below the level of the non-aggressive acrylic adhesive. The fabric 7 is drawn through a pair of squeegee rollers 26 positioned over the trough 22 which causes excess adhesive to be "squeezed" out and returned to the supply trough while simultaneously assuring that the adhesive penetrates and fills the interstices between the yarns. The fabric 7 is then passed through a pair of pinch rollers 27 at which station there is applied to each surface of the adhesive coated fabric 7 a release film 28 and 29, respectively. Release films 28 and 29 comprise a thin plastic material and covers the pressure sensitive adhesive on both surfaces of fabric 7. The pinch roles 27 apply a slight pressure as the material is drawn through the roles thereby pressing the release films to the adhesive. The resultant product is drawn through a heater for drying and then stored on a supply role 31.

In installation of the underlay to a rug prior to placement on a carpet, an underlay of a size corresponding to that of the rug is first selected. Any necessary trimming may be done prior to application of the underlay to the rug. The rug is placed face down in a location selected. One layer of the release film, for example, 12 is removed from the underlay which is then applied to the back or underside of the rug. To adhere the underlay on the carpet, the rug is first placed face up on the carpet in the exact area in which the rug is to be displayed. Thereafter the rug is folded back on itself halfway and the exposed release foil cut along the fold line and peeled off to expose one half of the adhesive. The rug is then folded back to place the adhesive surface against the pile face of the carpet. The other half of the rug is then folded back on itself and the remainder of the polymer release film peeled off exposing the other half of the adhesive. The other half is then folded down onto the carpet so that the entire adhesive coating of the underlay rests against and grips the pile surface causing the rug to be gripped firmly to the carpet surface.

If desired, the release layer may include tear lines to facilitate separation of the film.

When the rug is initially installed, it can easily be peeled upwardly away from the underlying carpet for accurate repositioning or relocation. Any well known non-aggressive latex acrylic may be utilized. By non-aggressive, it is meant one that permits the rug to be readily lifted from the carpet when desired.

Advantageously, delamination of the underlay from the rug is prevented because, the adhesion to the carpet fibers is not as great as that of the adhesion to the backing of the rug. The undersurface of the rug is substantially flat such that the adhesive coating of the underlay applied thereto has substantial full contact with the entire area of the underside. On the other hand, because of the spacing of the tuft yarns in the pile face of the fabric, the rug underlay grips the carpet fibers at their points or top surfaces of the yarn. Thus, there are several spaced areas in which there is no adhesion between the underlay and carpet yarns. Consequently, when it is desired to raise the rug from the carpet the rug lifts easily from the carpet without danger of delamination of the underlay from the rug. If it is desired to store the rug for later use, a release film may be applied to the adhesive side of the underlay.

While this invention has been described in conjunction with specific embodiments thereof, it is evident that many alternative, modifications and variations will be apparent to those skilled in the art. Accordingly, the preferred embodiments of the invention as set forth herein are intended to be illustrative, no limiting. Various changes may be made without departing from the spirit and scope of the invention as defined herein and the following claims.

I claim:

1. A rug underlay comprising a rug underlay substrate woven from flat ribbon warp and fill yarns in a tight weave, first and second adhesive coatings disposed on opposite sides of said substrate, said adhesive coat the exposed yarn surfaces and fills the interstices between the warp and fill yarns rendering said substrate impervious to liquid, and a peelable protective liner on each of said coatings.

2. A rug underlay as set forth in claim 1, wherein said flat ribbon warp and fill yarns are polypropylene yarns woven in a tight weave of at least 15 pick.

3. A rug underlay as set forth in claim 1, wherein said protective liner is a polymer film.

4. A rug underlay as set forth in claim 1, wherein said substrate is woven of polypropylene warp and fill yarns, said warp and fill yarns being flat monofilaments, of substantially rectangular cross section.

5. A rug underlay as set forth in claim 1, wherein said adhesive coating is a latex acrylic.

6. A rug underlay as set forth in claim 4, wherein said adhesive coating is a pressure sensitive latex acrylic adhesive.

* * * * *